(No Model.)

C. A. WOOLSEY.
INSULATOR BRACKET.

No. 595,827. Patented Dec. 21, 1897.

Witnesses
Edward F. Allen.
Thomas J. Drummond.

Inventor:
Charles A. Woolsey.
by Crosby Gregory
attys.

UNITED STATES PATENT OFFICE.

CHARLES A. WOOLSEY, OF BROOKLYN, NEW YORK.

INSULATOR-BRACKET.

SPECIFICATION forming part of Letters Patent No. 595,827, dated December 21, 1897.

Application filed March 29, 1897. Serial No. 629,781. (No model.)

*To all whom it may concern:*

Be it known that I, CHARLES A. WOOLSEY, of Brooklyn, in the county of Kings and State of New York, have invented an Improvement in Insulator-Brackets for Wires, Pipes, &c., of which the following description, in connection with the accompanying drawings, is a specification, like letters on the drawings representing like parts.

It is extremely advantageous in handling electric-light wires or inclosing tubes therefor, or, in fact, rods, wires, or pipes of any description which are to be supported at intervals from a wall or posts, that convenient means should be provided for readily removing or substituting the wires, rods, pipes, or other things to be supported. However, the usual insulator supports or hangers which are commonly used make no provision for this, but require a considerable manipulation in order to permit the supported rod or wire to be removed or to permit another to be inserted.

It is the object of my invention, therefore, to provide a simple and durable hanger or support for this purpose which shall be capable of quick adjustment to clamp one or more wires or pipes in place or to permit their removal therefrom. With this end in view I have devised a supporting stud or bracket, preferably insulated, provided at its outer end with a clamping device which may be quickly opened and closed for the purpose indicated and may be tightly clamped against the inclosed wires, &c., without the necessity of employing extraneous tools therefor.

The details of my invention and further advantages thereof will be more fully understood in the course of the following description, reference being had to the accompanying drawings, and the invention will be further defined in the appended claims, forming a part of this specification.

Figure 1:
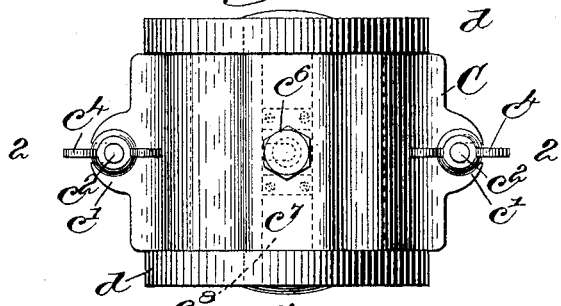
Figure 2:
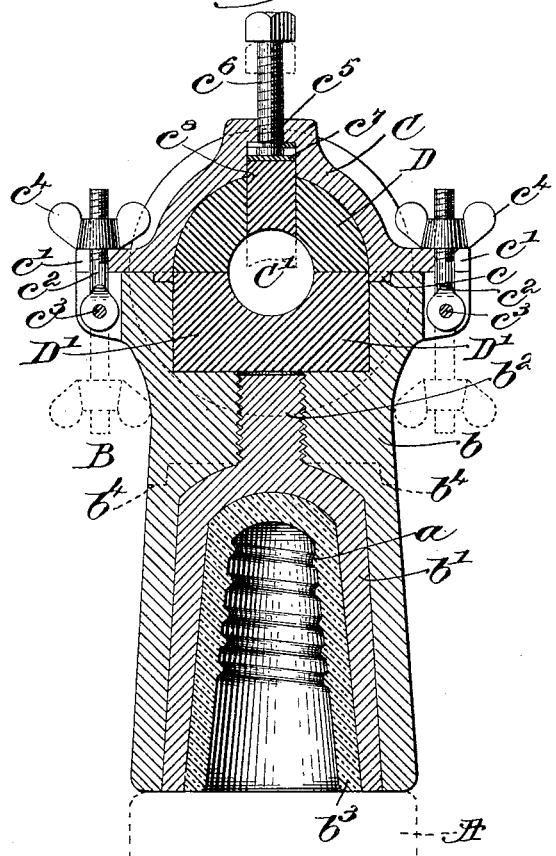

In the drawings, Figure 1 is a top plan view of one embodiment of my invention. Fig. 2 is a central vertical section thereof, taken on the line 2 2, Fig. 1.

I have herein shown my invention as applicable to the top of a telegraph, telephone, electric-light, or railway pole of the usual variety, the latter being indicated in dotted lines at A, Fig. 2, in which case the support or bracket will be provided with internal coarse threads $a$ to screw onto the ordinary wooden pin commonly used in such connection, although I wish it understood that my invention is not limited in any respect to this use nor to the means of fastening designated, inasmuch as it is readily applicable to all positions wherever wires, rods, or pipes of any description, whether for electric pipes, gas-pipes, water-pipes, &c., or wherever any other similar devices are to be supported and whether insulated or not.

B designates a base, (shown in Fig. 2 as comprising a body-piece $b$,) preferably in the form of a socket or shell, within which is fitted a securing portion $b'$, provided at its upper end with a threaded neck $b^2$ to fit a threaded socket in the body-piece, the securing portion or block $b'$ being shown as provided internally with insulating material $b^3$. The parts $b' b^3$ may be formed together as one piece, if desired. If preferred, the parts $b' b^2$ and the adjacent surrounding lower flange of the body-piece may be formed together, as indicated by the dotted line $b^4$, the whole lower portion in that case being screwed into the body-piece $b$ by means of the threaded neck $b^2$, as is evident.

At its outer end the supporting stud or bracket is provided with a cap C, fitting down against the end of the body-piece, being shown in Fig. 2 as provided with two depending ribs or legs $c$, fitted into the base at its engaging end. This cap is removable from the base and adjustable thereon by means of ears $c'$, provided on the cap, and threaded bolts $c^2$, pivoted at $c^3$ on the base, thumb-nuts $c^4$ being mounted on the free ends of the bolts extended laterally to bear on the ears $c'$.

It will be evident that by slightly loosening the nuts $c^4$ the bolts $c^2$ may be swung outwardly and down, enabling the cap to be instantly removed, or that the nuts $c^4$ may be loosened to permit the cap to be slightly lifted from the base for the insertion of an extra wire, it may be, or for the purpose of rearranging the wires already in place.

When the device is to be used for an insulating-support, it will be advisable to insert insulating-blocks D D', the opposite faces of the cap and base being recessed for this purpose, as clearly shown in Fig. 2, and the insulating-blocks being provided at each end thereof with flanges $d$, overlapping the adjacent portions, respectively, of the base and cap. The cap is perforated at $c^5$ to receive a clamping-bolt $c^6$, to the lower end of which is secured, by means of a recessed cap-plate and a bearing-plate $c^7$, a clamping-jaw $c^8$, the latter moving freely in and out of a slot provided therefor in the upper block D, so that when a wire or bar smaller than the central aperture C' is to be clamped it may readily be clamped in place by simply running down the bolt $c^6$ to carry the clamping-jaw $c^8$ into its dotted-line position, Fig. 2.

I do not restrict myself in any way to the specific details herein outlined and described, inasmuch as many changes in form, arrangement, proportions, and combination of parts may be resorted to without departing from the spirit and scope of my invention.

Various other means of insulation may be introduced—for instance, the studs or brackets may be made entirely of metal, if desired, or partly of wood and partly of metal, or of vulcanite, glass, or any other substance preferred.

Having fully described my invention, what I claim, and desire to secure by Letters Patent, is—

1. A device of the kind described, comprising a base adapted to be permanently secured, provided with a seat for the wire, pipe or other material to be supported, a removable cap to coöperate with said seat, and means permanently mounted on said base to move said cap and seat relatively toward each other into fixed clamping adjustment, substantially as described.

2. A device of the kind described, comprising a base adapted to be permanently secured, provided with a seat for the wire, pipe or other material to be supported, a removable cap to coöperate with said seat, means to move said cap and seat relatively toward each other into fixed clamping adjustment, and an auxiliary clamp movable in and relatively to said cap to clamp the wire or other thing supported, substantially as described.

3. In a device of the kind described, a removable cap, a slot therein, a clamping-jaw movable out and in in said slot, and a clamping-bolt having threaded engagement with the cap and swiveled engagement with said jaw, substantially as described.

4. An insulator-bracket for wires, pipes, &c., comprising a base adapted to be permanently secured, a removable cap, a seat between said cap and base for the wire, pipe or other material to be supported, and means to clamp said base and cap together, said means consisting of ears on one, a threaded bolt pivoted on the other to swing between said ears, and a nut on said bolt and extending laterally to bear on said ears, substantially as described.

5. In a device of the kind described, a base, comprising a body-piece, and a removable securing portion provided with means for securing the base to a support, said portion having threaded engagement with said body-piece, whereby the body-piece and the parts carried thereby may be quickly removed from said securing portion as desired, without disturbing the latter, substantially as described.

6. In a device of the kind described, a base, comprising a shell-like body-piece, and a removable securing portion adapted to fit within the body-piece provided with means for securing the base to a support, said portion having threaded engagement with said body-piece, whereby the body-piece and the parts carried thereby may be quickly removed from said securing portion as desired, without disturbing the latter, substantially as described.

In testimony whereof I have signed my name to this specification in the presence of two subscribing witnesses.

CHARLES A. WOOLSEY.

Witnesses:
EDWARD P. RYAN,
CARRIE W. WOOLSEY.